United States Patent
Adams et al.

(10) Patent No.: US 12,338,809 B2
(45) Date of Patent: Jun. 24, 2025

(54) DIAPHRAGM COMPRESSOR WITH AN OBLONG SHAPED CHAMBER

(71) Applicant: Nel Hydrogen A/S, Herning (DK)

(72) Inventors: Joshua Andrew Adams, Collingswood, NJ (US); Alexander George Murashko, Jr., Webster, NY (US); Leif Kappel Petersen, Lem St (DK)

(73) Assignee: NEL HYDROGEN A/S, Herning (DK)

( * ) Notice: Subject to any disclaimer, the term of this patent is extended or adjusted under 35 U.S.C. 154(b) by 1113 days.

(21) Appl. No.: 15/573,255

(22) PCT Filed: May 12, 2016

(86) PCT No.: PCT/DK2016/050127
§ 371 (c)(1),
(2) Date: Nov. 10, 2017

(87) PCT Pub. No.: WO2016/184468
PCT Pub. Date: Nov. 24, 2016

(65) Prior Publication Data
US 2018/0135616 A1    May 17, 2018

(30) Foreign Application Priority Data
May 19, 2015   (DK) ........................... PA 2015 70293

(51) Int. Cl.
| F04B 43/00 | (2006.01) |
| B32B 15/01 | (2006.01) |
| F04B 39/12 | (2006.01) |
| F04B 45/053 | (2006.01) |
| F04B 45/10 | (2006.01) |

(Continued)

(52) U.S. Cl.
CPC ............ F04B 43/009 (2013.01); B32B 15/01 (2013.01); F04B 39/121 (2013.01); F04B 45/0533 (2013.01); F04B 45/10 (2013.01); F04B 53/08 (2013.01); F04B 53/10 (2013.01);
(Continued)

(58) Field of Classification Search
CPC .. F04B 43/067; F04B 43/0054; F04B 43/009; F04B 45/04; F04B 45/053; F04B 45/0533; F04B 53/08; F17C 13/002; F17C 2221/012; F17C 2227/0157; B32B 15/01

See application file for complete search history.

(56) References Cited

U.S. PATENT DOCUMENTS

| 1,332,806 A | 3/1920 | Corblin |
| 1,563,166 A | 11/1925 | Corblin |

(Continued)

FOREIGN PATENT DOCUMENTS

| CN | 202194808 U | 4/2012 |
| CN | 204041402 U | 12/2014 |

(Continued)

OTHER PUBLICATIONS

International Search Report for corresponding application PCT/DK2016/050127 filed May 12, 2016; dated Sep. 14, 2016.

*Primary Examiner* — Kenneth J Hansen
(74) *Attorney, Agent, or Firm* — CANTOR COLBURN LLP

(57) ABSTRACT

The invention relates to a high pressure diaphragm compressor for pressurizing a gaseous fluid to a pressure of at least 10 MPa, the compressor including a compressor head having an oblong shaped chamber.

22 Claims, 5 Drawing Sheets

(51) Int. Cl.
  *F04B 53/08* (2006.01)
  *F04B 53/10* (2006.01)
  *F17C 13/00* (2006.01)
(52) U.S. Cl.
  CPC ...... *F17C 13/002* (2013.01); *F17C 2221/012* (2013.01); *F17C 2227/0157* (2013.01)

(56) References Cited

U.S. PATENT DOCUMENTS

| | | | |
|---|---|---|---|
| 3,000,320 | A | 9/1961 | Ring |
| 3,508,845 | A | 4/1970 | Strassburger |
| 3,668,978 | A * | 6/1972 | Bowen ............... F04B 43/0054 92/98 R |
| 4,430,048 | A | 2/1984 | Fritsch |
| 5,074,755 | A | 12/1991 | Vincent |
| 6,007,309 | A | 12/1999 | Hartley |
| 6,554,578 | B1 | 4/2003 | Siegel |
| 6,595,758 | B1 | 7/2003 | Hauser |
| 6,672,841 | B1 | 1/2004 | Herklotz |
| 2001/0043872 | A1 | 11/2001 | Schluecker |
| 2002/0006336 | A1* | 1/2002 | Kato ............... F04B 27/0886 417/222.2 |
| 2002/0044874 | A1* | 4/2002 | Kleibrink ............ F04B 45/0533 417/383 |
| 2003/0031565 | A1 | 2/2003 | Kleibrink |
| 2004/0086397 | A1* | 5/2004 | Bowen ............... F04B 43/0054 417/392 |
| 2008/0053310 | A1 | 3/2008 | Bliss |
| 2010/0104458 | A1 | 4/2010 | Grapes |

FOREIGN PATENT DOCUMENTS

| | | |
|---|---|---|
| CN | 104534271 A | 4/2015 |
| DE | 3704588 A1 | 8/1988 |
| DE | 102010060532 A1 | 5/2012 |
| DK | 201570293 A1 | 5/2015 |
| EP | 1418366 A1 | 5/2004 |
| EP | 2703709 A1 | 3/2014 |
| EP | 2816233 A1 | 12/2014 |
| FR | 864365 | 3/1940 |
| GB | 1111602 | 5/1968 |
| JP | S55148989 A | 11/1980 |
| JP | 1980088087 | 1/1982 |
| JP | 1988016181 | 1/1988 |
| JP | H01203672 A | 8/1989 |
| JP | 1989250672 | 10/1989 |
| JP | 1998030679 | 2/1998 |
| JP | 2002529656 | 9/2002 |
| JP | 2005030240 | 2/2005 |
| JP | 2009097415 | 5/2009 |
| JP | 2011247117 | 12/2011 |
| WO | 2005088128 A1 | 9/2005 |
| WO | 2009157026 A1 | 12/2009 |
| WO | 2010098707 A1 | 9/2010 |
| WO | 2016184468 A1 | 11/2016 |

* cited by examiner

DIAPHRAGM COMPRESSOR WITH AN OBLONG SHAPED CHAMBER

TECHNICAL FIELD

The present invention relates to a high pressure diaphragm compressor comprising a compressor head having an oblong shaped chamber, the use of such compressor in a hydrogen refueling station and a refueling station with such compressor.

BACKGROUND

Industrial compressors are known for various different purposes and the pressure ranges of these compressors vary according to the purpose of the compressor. In the same way the design of the compressors are also sometimes customized to a specific purpose. However when a compressor are to provide a high pressure e.g. starting from above 1 MPa but particularly above 10 MPa the physical size and energy consumption of such high pressure compressors start to increase. When increasing the volume of the compressor head, at a point the bolts fastening the two compressor head parts would have difficulties holding the compressor head parts together due to the increased pressure load resulting from the increased volume of the compressor chamber.

BRIEF SUMMARY

The invention relates to a high pressure diaphragm compressor for pressurizing a gaseous fluid to a pressure of at least 10 MPa, the compressor comprising a compressor head having an oblong shaped chamber.

According to an embodiment of the invention, the chamber is defined by an upper head and a lower head of the compressor head, wherein the chamber comprising an upper chamber and a lower chamber separated by a diaphragm, wherein the upper head comprising an inlet valve facilitating a fluid connection between the upper compartment and a first gaseous system, wherein the upper head comprising an outlet valve facilitating a fluid connection between the upper compartment and a second gaseous system wherein the lower head comprising a plurality of ports facilitating a fluid connection between the lower compartment and a hydraulic system, wherein the hydraulic system comprising a piston facilitating moving the diaphragm in the chamber by circulation of a hydraulic fluid, and wherein the compressor further comprising leakage detection system detecting leakage of gaseous fluid or hydraulic fluid from the chamber. Preferably the pressure ratio between the first and second pressure is at least 1:1.05 with examples of 1:1.1 and 1:1.2 thereby facilitating increasing a first pressure of the first fluid system to a second pressure of the second fluid system.

By making a chamber having an oblong shape it is possible to obtain a larger chamber volume with the same material as compared to other shapes such as traditional circular shaped chambers. Hence due to increased clamping force and improved gas and heat distribution the pressure vs material volume ratio, obtained by the present invention is higher than traditional circular chamber designs.

By the term compressor should be understood an apparatus configured for pressurizing a fluid preferably a gaseous fluid hence such apparatus could also be referred to e.g. as a pump and is used for industrial purposes i.e. not medical or dosing purposes.

By the term first gaseous system should be understood as a part of a gaseous fluid system comprising a storage where the gas is stored at a one pressure. The second gaseous system should be understood as part of a gaseous fluid system comprising either another higher pressure storage or e.g. an outlet for delivering the gas to an external fluid system such as e.g. a vehicle or storage.

By the term oblong should be understood a spherical form which is elongated in one direction i.e. a shape which is not circular nor a square.

Having an oblong shaped chamber is advantageous in that the distance between the nearest fastening points across the compressor head is reduced. Hence for an oblong compressor head having a given pressure limit/volume this leads to a reduction of material thickness required for such compressor head compare to a compressor head having a traditional circular shaped cavity. Hence an oblong shaped chamber allows higher pressure with less material.

The specific geometry of the oblong shaped chamber has several advantages. The primary advantage of the oblong shaped head is that it enables an improved flow distribution especially of the hydraulic fluid. This allows an increased mass flow through the chamber without increasing the size of the compressor head. Thereby the capital cost per unit of capacity is reduced in that the mass flow, the lifetime of components such as diaphragm, volumetric efficiency, etc. is increased.

Further, the oblong shaped chamber is advantageous in that the effective surface area e.g. considering heat transfer to volume ratio of the chamber is increased, thus facilitating an increased potential for heat transfer and therefore a better efficiency of compression. Further, the oblong chamber facilitates separation of inlets and outlets to the chamber which then facilitates a less turbulent gas flow in the chamber from inlet to outlet. This linear gas flow is advantageous in that there is less friction and more stability in the gas flow path from inlet to outlet in the chamber.

The design of a gas compressor or compressors for handling a gas face problems with leakage which are not present to the same extent in relation to liquid compressors due to the different nature of gas and liquid.

It is advantageous to be able to detect leakage in that leakage at also at high pressure may indicate that something is wrong i.e. a component may be malfunctioning and therefore has to be fixed or replaced before major damage happens to the compressor, release to atmosphere or contamination of the gas stream happens.

According to an embodiment of the invention, the ratio of depth Z to width Y of the upper compartment $3a$ is between 1:10 (Z:Y) and 1:100, preferably between 1:25 and 1:85, most preferably between 1:45 and 1:75. Such dimensions define an advantageous relationship complying with demands in relation to volume, speed and pressure. Hence according to an advantageous embodiment of the invention if the depth is 3 mm measured from resting plan of the diaphragm E to point I and the width of the chamber is 150 mm measured from point B to point D the ratio is 1:50.

The resting plan E of the diaphragm is defined as the plane wherein the upper and lower heads meets when assembled and therefore if the diaphragm is not pre-formed e.g. to reduce stress, then this plane is also the positon of the diaphragm when the compressor is not in used.

According to an embodiment of the invention, the ratio of the width Y to length X of the chamber is at least 1:1.2 (Y:X). In an embodiment if the width is 100 mm (Y) measured from point B to D and the length is 250 mm (X) measured from point A to D the ratio is 1:2,5 ratio (Y:X).

According to an embodiment of the invention, the inlet valve and the outlet valve are both located in a plane F in the upper head. According to an alternative embodiment of the invention the openings may be openings from the side of the upper head and thereby at least partly entering the upper head non-perpendicular to the resting positon of diaphragm.

Further it should be mentioned that the output opening is typically less in diameter than the inlet opening.

According to an embodiment of the invention, the distance R between the center G of the opening comprising the inlet valve and the center H of the opening comprising the outlet valve is at least 35% of the length X of the chamber. It should be mentioned that the distance R easily could be up to and above 50% of the length X of the chamber. This is advantageous in that thereby is defined a predefined flow path which are leading the gaseous fluid directly from the inlet valve to the outlet valve.

This is in contrary to e.g. circular chambers which to increase useful chamber volume locates the valves as close to each other in the top of the chamber as possible. This leads to not direct flow path between the valves.

According to an embodiment of the invention, the oblong shape is an elliptic shape, preferably a super elliptic shape. Preferably the shape is elliptic which should be interpreted as any kind of elliptic shape possible to calculate by mathematic formulas including super elliptic shape. It is preferred if the ends of the chamber has a super elliptic shape in that this will reduce the stress of the diaphragm significantly compared to a chamber having other oblong shape.

According to an embodiment of the invention, the tilt angle between the direction of the movement of the piston and the direction of at least one of the plurality of ports is less than 90 degrees, preferably less than 45 degrees most preferably less than 30 degrees. The chamber of the compressor head is partly formed by an upper head and a lower head, wherein the plurality of ports are formed in the lower head. The ports together with the compression chamber of the fluid system define part of a flow path for the hydraulic fluid to follow from the hydraulic fluid system to the lower compartment.

It is advantageous if this hydraulic flow pathway is not in the same plane as the diaphragm nor perpendicular to the diaphragm when the diaphragm is in a resting position. Hence it is advantageous if this hydraulic flow path is straight from the piston towards the inlet valve. This is because the flow path for the flow of the hydraulic fluid then is optimized for maximum operation speed in that the number of corners or edges the hydraulic fluid has to pass on its way from the hydraulic system chamber towards the lower chamber is minimized. The effect of this design is an increase of speed and thereby capacity for the same volume as compared to traditional compressor head design.

Further by having a flow path as described the number of turns the hydraulic fluid has to pass is limited as well corners or edges can be smoothened. This is advantage in that it facilitates as little resistance as possible for the flow of the second fluid.

Preferably all individual ports are adjusted with respect to the direction of movement of the piston to optimize the flow, alternatively all or at least a part of the ports are having the same angle.

According to an embodiment of the invention, the flow path of the hydraulic fluid from compression chamber of the hydraulic system towards the inlet valve is substantially linear.

According to an embodiment of the invention, the hydraulic fluid impacts a first end of the longitudinal direction of the diaphragm before a second end of the longitudinal direction of the diaphragm. This is advantageous in that by this design the hydraulic fluid enters the chamber at the end where the inlet is located (a first end of) and thereby closing the inlet before the outlet when the reciprocating member of the compression chamber is moving towards the oblong chamber (discharge stroke). In the same way the inlet is opened before the outlet when the reciprocating member is moving away from the elliptic chamber (inlet stroke).

The effect of this design is a wave like movement of the diaphragm facilitating a control flow of gas from inlet to outlet of the upper chamber facilitating higher operation speed. This wave like movement of diaphragm from the areas of the inlet into the chamber towards the outlet of the chamber facilitating an increase of speed significantly e.g. up to or even above 400% compared to traditional circular compressors leading to a more efficient compressor head.

According to an embodiment of the invention, the upper head includes cooling channels guiding a coolant from the area around the outlet valve towards the direction of the predefined flow path towards the inlet valve.

According to an embodiment of the invention, at least one cooling channel is linear between the inlet valve and the outlet valve. This is advantageous in that cooling between the inlet and outlet openings is then obtained.

Such asymmetric cooling is advantageous in that coolant is supplied as close to the outlet as possible and thereby the coolant at its coldest level enters the upper head as close as possible to where the gas reaches its highest temperature i.e. when it is compressed and on its way out of the cavity.

Further it is advantageous to lead the coolant in a preferably straight line between the inlet and outlet, turn around the inlet and return to the outlet area. This is because due to the elongated shape of the chamber the gas when compressed by the diaphragm is concentrated in a flow path which is substantially linear between the inlet and the outlet.

Hence a compressor head having straight line cooling channels are more effective at transferring heat from the gas being compressed. This characteristic is amplified as the diaphragm approaches the surface of the process head.

The improved cooling is obtained by the inventive design of inlets and outlets of the gaseous fluid to the chamber of the compressor head allowing a definite direction of motion of the first fluid from the inlet towards the outlet and therefore opportunity to achieve an increased temperature gradient between a coolant and the gaseous fluid to be cooled.

According to an embodiment of the invention, the inner surface of the upper head and/or the inner surface of the lower head and or the diaphragm is coated by physical vapor deposition.

According to an embodiment of the invention, the coating is an amorphous carbon coating.

According to an embodiment of the invention, the amorphous carbon coating is a diamond-like carbon. According to embodiments of the invention where the inner parts of the upper and/or lower heads and/or the diaphragm operates in dry environment it is advantageous to coat the these parts to reduce wear and decrease heat generation as the diaphragm moves. This is especially relevant in situations where the first and/or second fluid is in a gaseous state.

According to an embodiment of the invention, the diaphragm is made of a plurality of individual stacked sheets, preferably three sheets. This is advantages in that a diaphragm made of a plurality of sheets is more flexible compared to a diaphragm made of a single sheet of material. For a given thickness, a diaphragm composed of a plurality of sheets maintains nearly equal strength over the area of the ports of the compressor chamber while providing increased flexibility for bending to the cavity form.

According to an embodiment of the invention, the sheets are made of Inconel alloy 718.

According to an embodiment of the invention, at least one side of an upper sheet and one side of a middle sheet of the plurality of stacked sheets are coated.

According to an embodiment of the invention, the coating is made physical vapor deposition or dipping and is selected from the list comprising: diamond like coating, Chromium Nitride coating, silver coating. The coating of the sheets is advantages in that then wear of the sheet is reduced compared to raw non-coated sheets. The coating is therefore an advantageous alternative to introducing lubrication to raw material sheets which would also reduce wear of non-coated sheets.

According to an embodiment of the invention, the diaphragm is a sliding diaphragm. By the term sliding should be understood that the diaphragm is not clamped directly to the chamber or parts forming it. The advantages hereof is that stress of the diaphragm is reduces in that it can move more freely as compared to diaphragms which are clamped to the chamber forming parts.

Preferably the diaphragm is made of austenitic-nickel alloy or alternatively steel, plastics, brass, (high) nickel alloy, flexible elastomeric material and similar materials being resistant to hydrogen embrittlement. Elastomeric materials are advantageous in that such material is more flexible than materials such as steel or nickel alloys.

According to an embodiment of the invention, the pressure in the upper compartment is above 70 MPa and wherein the upper head and the lower head are connected by a plurality of bolts. Preferably by ordinary bolts i.e. not super bolts.

According to an embodiment of the invention, the piston of the hydraulic system is configured for operating above 600 cycles per minute. A compressor head having an elongated chamber is advantageous in that traditional design using bolts for fastening is available at higher volume and pressure limits than traditional compressor heads. Hence by the present invention it is possible to exceed 500 cycles per minute/70 MPa compressors head without changing design and thereby avoid e.g. use of expensive super bolts or bootstrap design when volume and/or pressure increases above these values.

According to an embodiment of the invention, the gaseous fluid is a low density gas preferably hydrogen.

Moreover the invention relates to the use of the compressor according to any of the claims 1-19 in a hydrogen fueling station.

Moreover the invention relates to a hydrogen fueling station comprising a first hydrogen storage and a second hydrogen storage and a compressor having an oblong shaped chamber moving hydrogen in a first pressure of the first hydrogen storage to a second pressure in the second hydrogen storage.

BRIEF DESCRIPTION OF THE DRAWINGS

In the following, a few exemplary embodiments of the invention are described with reference to the figures, of which

DETAILED DESCRIPTION

Figure 1:
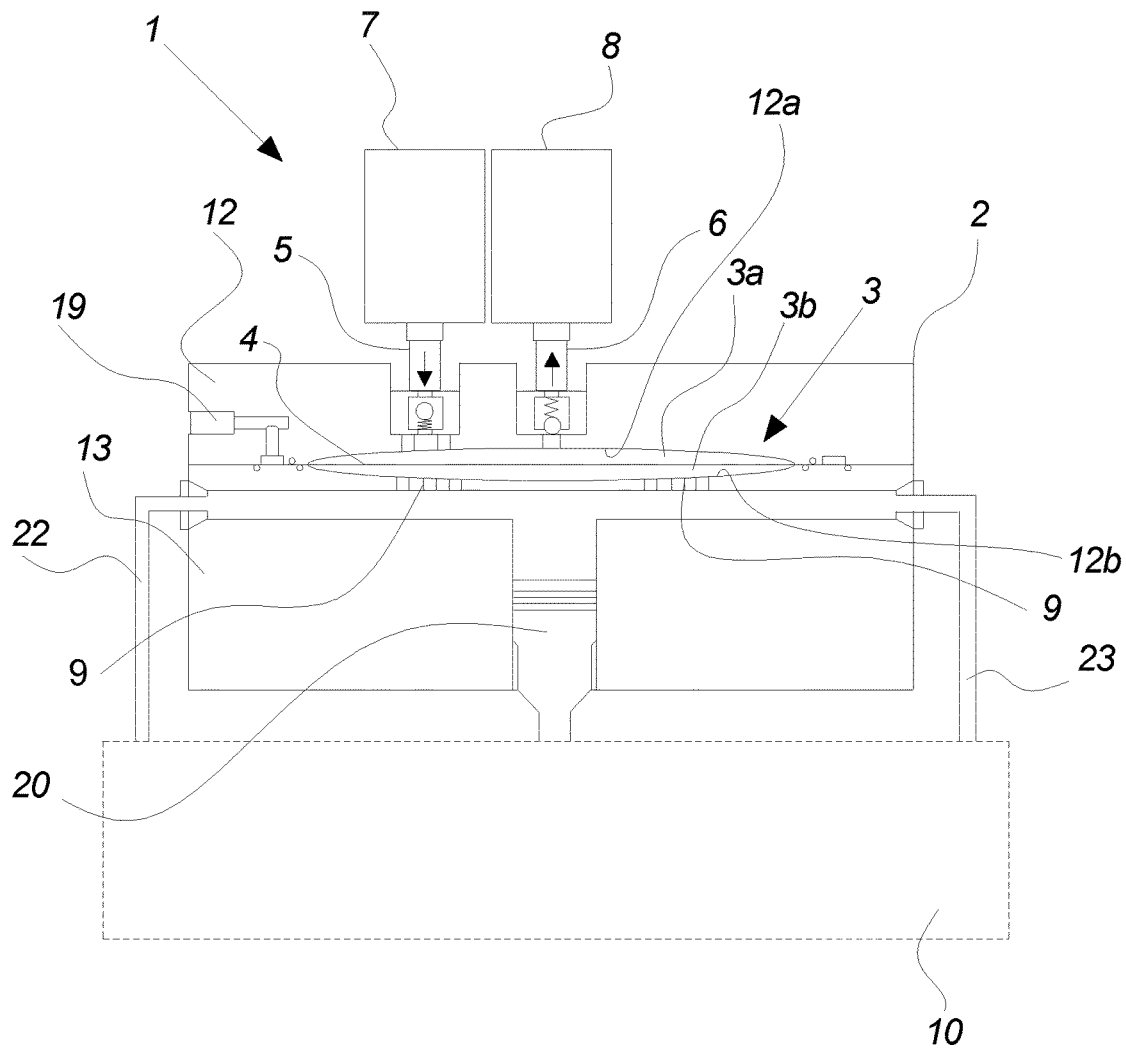
FIG. 1 illustrates a compressor according to an embodiment of the invention.

A schematic overview of a diaphragm pump 1 according to an embodiment of the invention is shown in FIG. 1.

An upper head 12 and a lower head 13 are assembled to form together a compressor head 2, the joining surfaces of the upper head 3 and the lower head 4, respectively, abutting each other substantially in a plane. Inside the pump head 2, the surfaces of the upper head 3 and the lower head 4, respectively, together form a compressor head chamber 3. This chamber 3 is divided into two compartments by a movable diaphragm 4 arranged in the same plane, in which the upper head 3 and the lower head 4 are assembled to form the pump head 2.

The compartment between the diaphragm 4 and the upper head 12 is generally referred to as the upper compartment 3a or process fluid chamber. Similarly, the compartment between the diaphragm 4 and the lower head 4 is referred to as the lower chamber 3b or the hydraulic fluid chamber.

As seen from FIG. 1 a hydraulic system 10 is in fluid connection with the lower chamber 3b via hydraulic input 22 and hydraulic output 23. A hydraulic piston 20 is pumping hydraulic fluid to and from the lower chamber 3b.

When hydraulic fluid is pumped into the lower chamber 3b, the diaphragm 4 is pressed towards the upper head 12 and the volume of the upper chamber 3a decreases. This causes the pressure of the process fluid enclosed therein to increase, and when a certain pressure has been reached, a process fluid discharge check valve also referred to as outlet valve 6 mounted in the upper head 3 opens and releases the process fluid into a second gaseous system 8. In order to drive all the residing process fluid out of the upper chamber 3a, the piston 20 keeps pumping hydraulic fluid into the lower chamber 3b until the diaphragm 6 is fully in contact with the inner surface of the upper head 12a so that the upper chamber 3a is very small. In principle zero volume but typically there will be a small volume in which process fluid is trapped.

When hydraulic fluid is sucked out of the lower chamber 3b at the backstroke or discharge stroke of the hydraulic piston 20, the outlet valve 6 closes, the diaphragm 4 follows the hydraulic fluid level down, the volume of the upper chamber 3a increases and the pressure therein decreases. When the pressure in the upper chamber 3a has fallen below the inlet pressure of the process fluid, a process fluid inlet check valve also referred to as inlet valve 5 mounted in the upper head 3 opens and process fluid flows into the upper chamber 3a from a first gaseous system 7 as long as the hydraulic piston 20 moves back and the volume of the upper chamber 3a increases.

When the hydraulic piston 20 starts moving forwards again (inlet stroke), the inlet valve 5 closes, and the cycle of operation is repeated.

The first fluid system 7 may be a gaseous fluid storage 29 preferably at a first pressure (e.g. 20-50 MPa) hydrogen storage and the second fluid system 8 may also be a gaseous fluid storage 30 preferably a second (e.g. 50-100 MPa) pressure hydrogen storage. The first fluid system 7 may be part of a hydrogen refueling station 18 and the second fluid system 8 may be a hydrogen storage of a vehicle 31.

It is important to keep the diaphragm 4 in phase with the hydraulic piston 20 further it is desired to make sure that the lower chamber 3b is completely filled so that the diaphragm 4 is actually in contact with the inner surface of the upper head 12a at the end of the discharge stroke of the hydraulic piston 20. In order to ensure this, the hydraulic system 10 may comprise injection pumps, inlet valves, outlet valves control valves, and the like. Information about the amount of discharged hydraulic fluid can be used for adjusting the settings of the diaphragm compressor 1 appropriately. In other embodiments, however, other (possibly non-synchronized) methods can be used for adding additional hydraulic fluid into the lower chamber 3b.

FIG. 1 further illustrates a leakage detection unit 19 which serves the purpose of detecting if any of the gaseous fluid or hydraulic fluid escapes the chamber 3. The leakage detection unit 19 may be implemented as a pressure valve activated in case of leakage. No matter how fluid escapes the chamber 3 it is preferred that the leakage detection unit 19 detects it. Alternatively more than one leakage detection unit 19 is used.

Valves 5, 6, 19 and the hydraulic system 10 including the piston 20 and other not illustrated components may together with the first and second gaseous fluid systems be control together or individually by not illustrated control systems. Such control systems are state of the art control systems for controlling compressors and is therefore not described any further.

Figure 2:
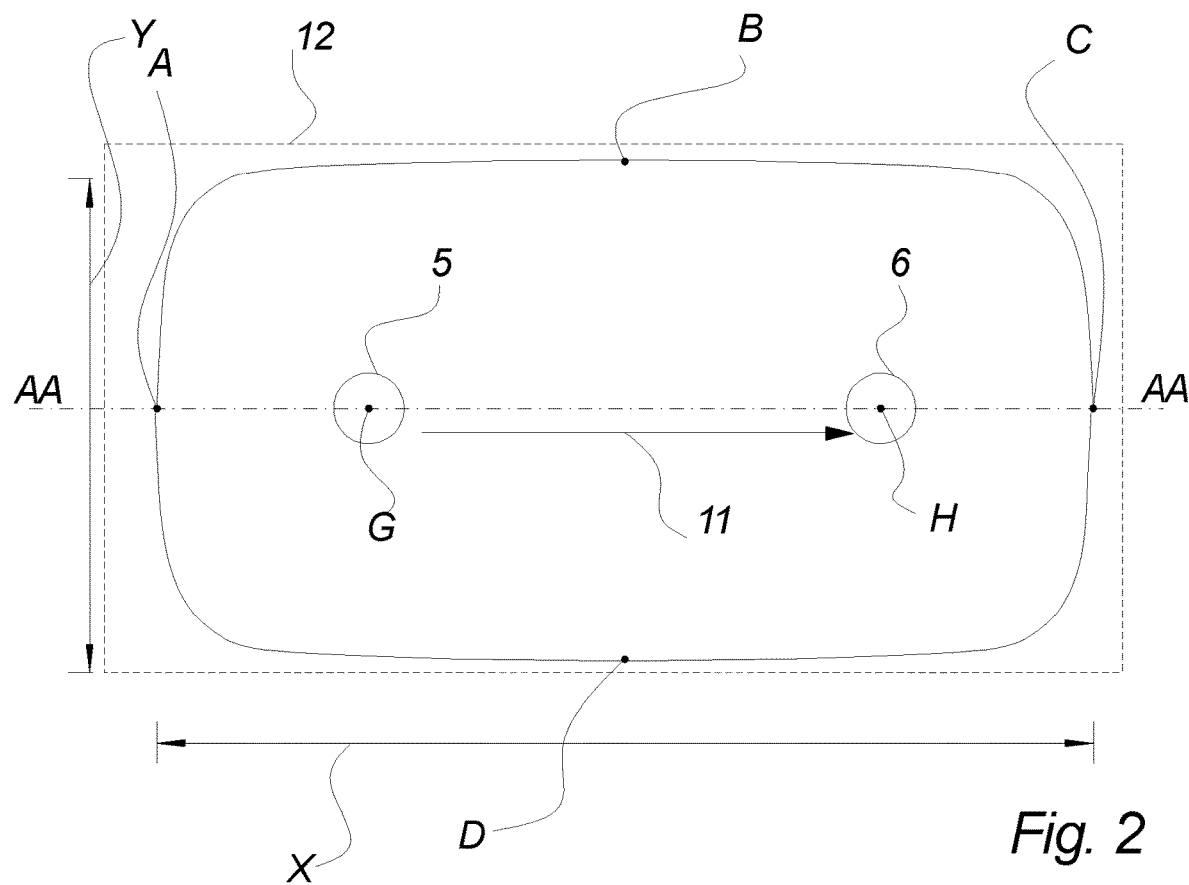
FIG. 2 illustrates a top view of the compressor chamber.

FIG. 2 illustrates the upper chamber 3a part located in the upper head 12 seen from diaphragm 4. Preferably the chamber 3 has an elongated oblong shape meaning that it is longer that it is wide and preferably the upper and lower chamber 3a, 3b are equal in geometry however the volume of the lower chamber 3b may be larger in the volume of the upper chamber 3a. This is mainly because the stress of the diaphragm 4 is higher at the end of a discharge stroke where the diaphragm 4 preferably is in contact with the inner surface of the upper head 12a which is preferably not the case at the end of an inlet stroke i.e. here the diaphragm 4 is preferably not in contact with the inner surface of the lower head 13a. The length X of the chamber 3 is measured between opposite endpoints A, C which respectively represents the end points of the chamber 3. In the same way the wide Y of the chamber 3 is measured between opposite endpoints B, D which respectively represents the side points of the chamber 3.

Hence the length X is defined as the longest distance between two opposing end points A, C preferably measured in a direction parallel to a line between the inlet valve 5 and the outlet valve 6. And the width is defined as the longest distance between two opposing side points B, D preferably measured in a direction perpendicular to the line between the inlet valve 5 and the outlet valve 6.

It is preferred that the ratio between the width Y and length X is at least 1:1.2. In examples of a 1:1.5 ratio the width Y vs lengths X ratios could be width Y at least from 120 mm-180 mm and length X at least from 180 mm-270 mm. But as mentioned the width Y vs the length X ratio could also be higher such as e.g. 1:1.6, 1:1.7 . . . 1:2, etc.

According to a preferred embodiment, Y=150 and X=270 i.e. the ratio may be expressed as Y/X=0.55 (150/270) or Y:X=1:1.8 (150×1.8). This is within a preferred range of ratios of 0.40 to 0.90 (Y/X).

Figure 3:
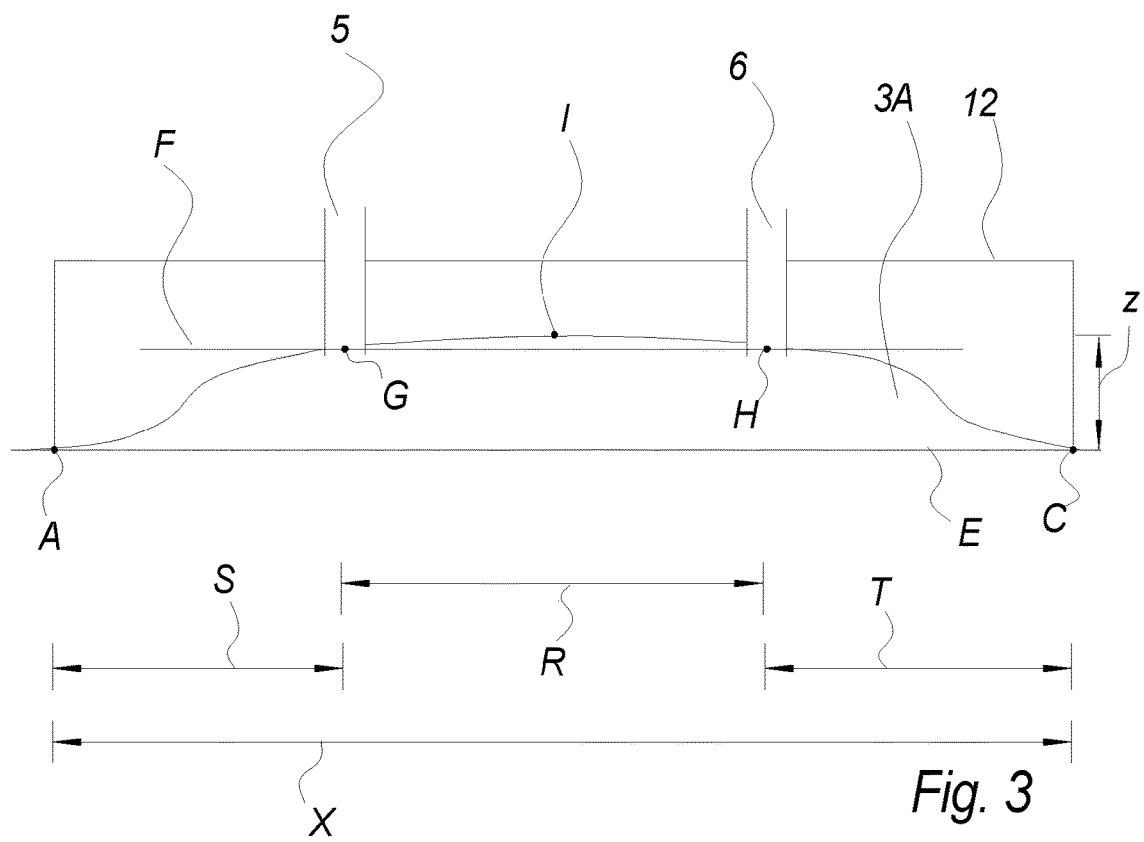
FIG. 3 illustrates a side view of the compressor chamber.

FIG. 3 illustrates a side view of the upper chamber 3a part located in the upper head 12 with a length X measured between endpoints A, C. The side view is at the line AA of FIG. 2. The depth Z is illustrated as the distance between the point I perpendicular to the plane E. The plane E is defined by the position of the diaphragm 4 when it is in a resting position i.e. when the pressure in the upper and lower chambers 3a, 3b is the same. The point I is defined as the top point of the upper chamber 3a i.e. the point between which the perpendicular distance to the plane E is longest. Preferably the point I is located at an equal distance between inlet and outlet valves 5, 6.

It is preferred that the ratio between the depth Z and the width Y is between 1:10 and 1:100 meaning that the width Y is very much wider than the depth Z. Typically the ratio would be around 1:40 plus minus 20 hence examples of depth Z vs width Y ratios could be Z=3 vs Y=60 mm-180 mm. This could also be expressed as a ration of (Z/Y) of 0.05 to 0.0167.

In a preferred embodiment of the invention the dimensions of the upper chamber 3a is depth Z=2 mm, width Y=150 mm, length X=270 mm and the distance R between openings G and H is 130 mm.

Further, FIG. 3 illustrates the location of openings in the upper head 12 allowing inlet and outlet valves 5, 6 to be mounted and thereby controlling the inlet and outlet of process fluid also referred to gaseous fluid to and from the upper chamber 3a. As can be seen from the figure there is a distance R between the center of the inlet valve opening G and the center of the outlet valve opening H. Having an oblong chamber 3 facilitates increasing the space between the center points G and H compared to traditionally circular shaped chambers. The main advantage of this is that the gas flow from the inlet valve 5 to the outlet valve 6 can be controlled to follow a predefined flow path 11. This leads to less friction and facilitates asynchronous cooling to the gas.

Preferably but not necessarily the openings for the inlet and outlet valves 5, 6 is located in the same plane F in the upper chamber 3a.

Preferably the center G, H of the openings for the inlet and outlet valves 5, 6 is spaced by the same distance S, T from the respective endpoints A and C of the chamber 3. With this said it may also be possible to place the center G, H of the openings 5, 6 so that the distances S and T are not equal. Preferably the individual lengths S and T are less than the distance R between the center G, H of the openings 5, 6.

As can be understood from the above the geometry of the chamber 3 is of high importance for the volume of the cavity 3 and as mentioned below will reach an upper limit if not the traditional circular compressor head/chamber design is changed. In the following an elaboration of the increased volume is found. When considering a diaphragm compressor having a circular head, the area and therefore the clamping load required to hold the assembly of heads together under pressure, is increased with the square of the diameter of the head. This is a result of the equations of area of a circle and load resulting from pressure combined to end in a required clamping force on the compressor head assembly.

Considering a compressor head of substantial pressure rating (e.g. 50-100 MPa), the bolting load becomes large enough at a certain diameter where it becomes difficult to physically locate the bolts around the head perimeter. This is due to the increase in size of the bolts occurring faster than the increase in circumference of the compressor head. This is because the equation of perimeter or circumference of the circle having a linear relationship with the diameter.

Therefore when the diameter is further increased to physically locate the bolts on the perimeter of the head, the distance from where the bolts clamp to where the pressure boundary ends becomes larger. This thereafter results in further increased head thickness.

At this point the head thickness becomes non-linear in relation to the pressure and therefore the designer cannot physically locate the clamping bolts in a way to satisfy the required load without dramatically increasing the head thickness.

One method to circumvent this dilemma in design is to alter the shape of the compressor head 2 so as to increase the volume of the compression chamber 3*a* (also referred to as upper chamber 3*a*) without a disproportionate increase in required clamping force. This is done by the present invention by "cutting" the compression head 2 through the mid-plane and separate the halves. Thereafter, the halves are rejoined by adding material between them so as to create an elongated or oblong shaped head. In doing so, the pressure area and volume are increased linearly with a simultaneously linear increase in perimeter length to accommodate bolts for clamping. Thereby the problem of limited physical space for clamping bolts is avoided.

Hence if one imagined taking an elongated head 2 with an elongated chamber 3 and increasing the volume by adding material to it in such a way as to make the head circle. This would result in a largely increased clamping force required due to the increased pressure area, but not a considerable enough increase in volume. Furthermore this design would lead to gas that will be trapped in this volume at compression.

Figure 4A:
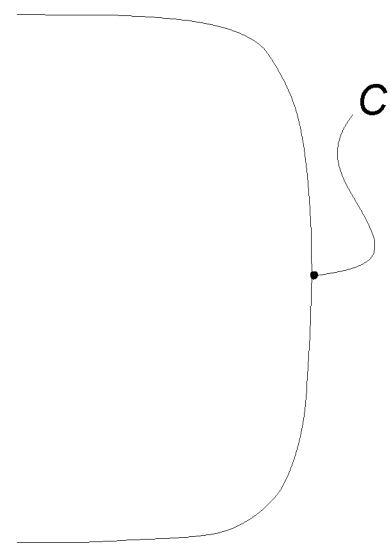
FIG. 4a illustrates a top view of part of one end of the compressor chamber.
Figure 4B:
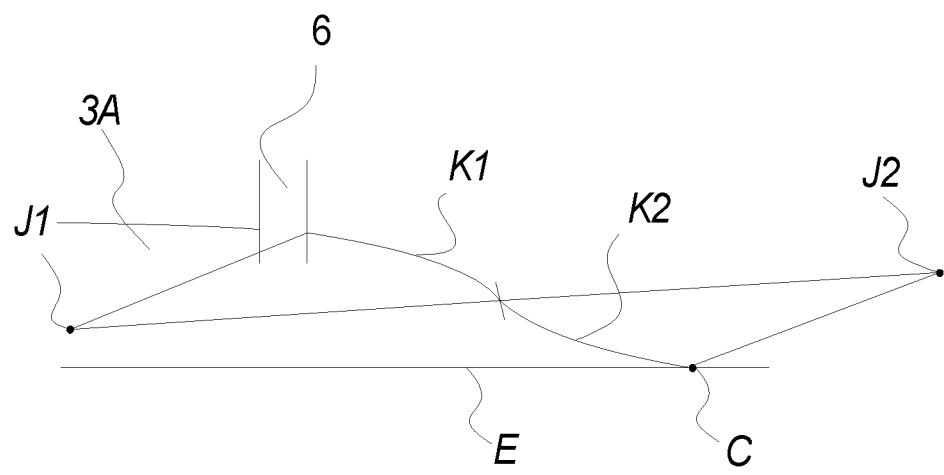
FIG. 4b illustrates a side view of part of one end of the compressor chamber.

FIGS. 4*a* and 4*b* illustrates an end part of the chamber 3 where FIG. 4*a* is seen in a top view and FIG. 4*b* is seen in a side view at the line AA of FIG. 2. In FIG. 4*a* the top view illustrates the end of a chamber 3 in an embodiment of the invention defined as a super ellipsis. The formula of such a super ellipsis is $$1 = \left|\frac{x}{a}\right|^n + \left|\frac{y}{b}\right|^n$$

The x,y points on a chamber having a super ellipse shaped curve form can be defined parametrically as:

$$x(\theta) = \pm a\cos^{\frac{2}{n}}\theta$$
$$y(\theta) = \pm b\sin^{\frac{2}{n}}\theta$$
$$0 \leq \theta < \frac{\pi}{2}$$

At FIG. 4*b* auxiliary center points J1 and J2 are defined, these points are center points defining circles of which parts of the circumference K1, K2 defines the shape of the chamber 3 seen in the side view. The radius for these circles is preferably equal in size and the size may be between 500 mm and 2000 mm. In cases where the radius of the circles is not equal in length often it is the radius of the circle with center point J1 which is the longest.

The center points J1, J2 are two center points of four circle center points of which parts of the circumferences may define the side view shape of the chamber 3 according to an embodiment of the invention.

The circle parts K1 and K2 illustrated in FIG. 4*b* are parts of elongated shaped circles, but circular circle could also be used to define the geometry of the chamber 3.

It should be mentioned that even though in that above the description is made in relation to the upper chamber 3*a* and one end of the chamber the same description in relation to geometry applies to the lower chamber 3*b* and the other ends or "corners" of the chamber 3.

Figure 5A:
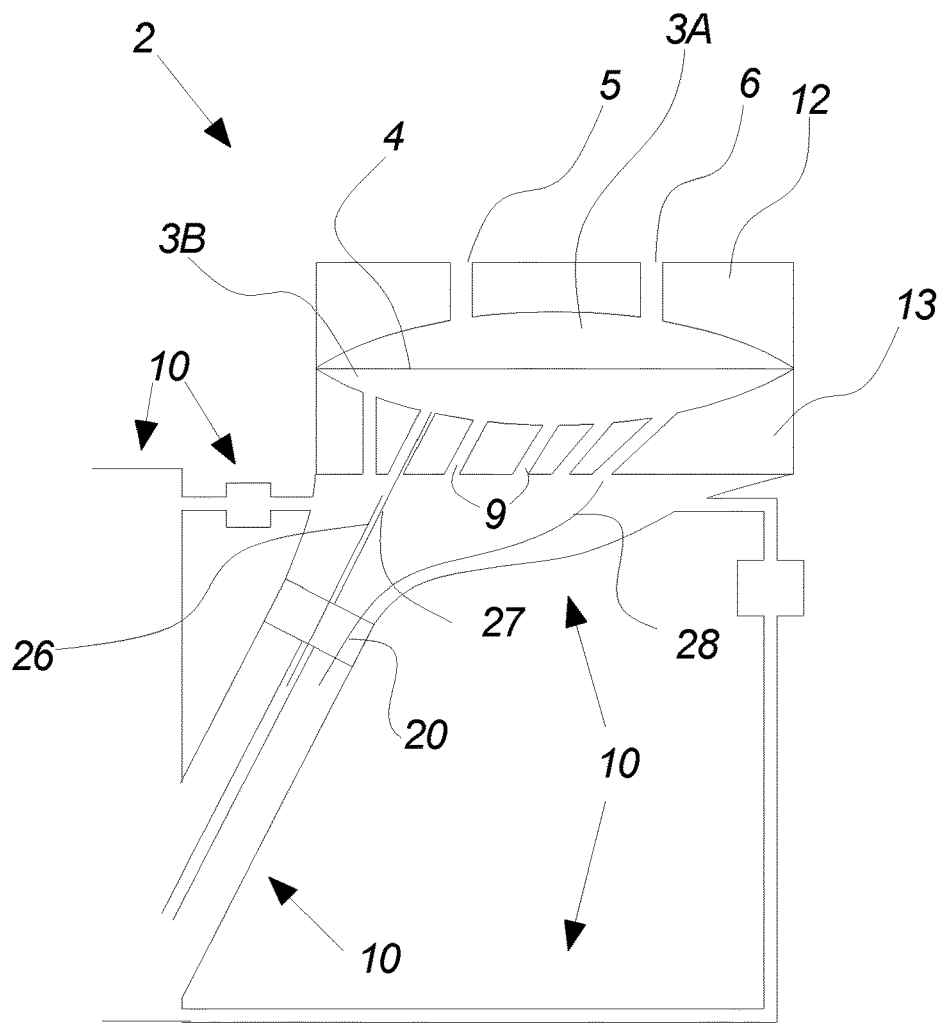
FIG. 5a, 5b illustrates part of a compressor head and hydraulic system.

FIG. 5*a* illustrates an ideal embodiment of the diaphragm compressor 1 and part of the hydraulic system 10 in a side view at line AA of FIG. 2. As can be seen FIG. 5*a* illustrates a movement of the piston 26 which the piston 20 follows in its reciprocal movements. Accordingly the hydraulic fluid will follow the path of the movement of the piston 26 as long as it does not meet resistance. Hence by having ports 9 through the lower head 13 which are tilted with a tilt angle of 0 degrees between the movement of the piston 26 and the direction of the ports 27 provides a straight hydraulic flow path from the piston 20 via at least one port 9 towards the inlet valve 5 illustrated by the movement of the piston 26. Hence in this example the directions 27 and 26 are parallel. This is very advantageous in that then there is not resistance for the hydraulic fluid on its way to and from the inlet valve which facilitates an increased operation speed of the piston 20 and thereby higher yield of a compressor with similar volume having ports which are not tilted.

Figure 5B:
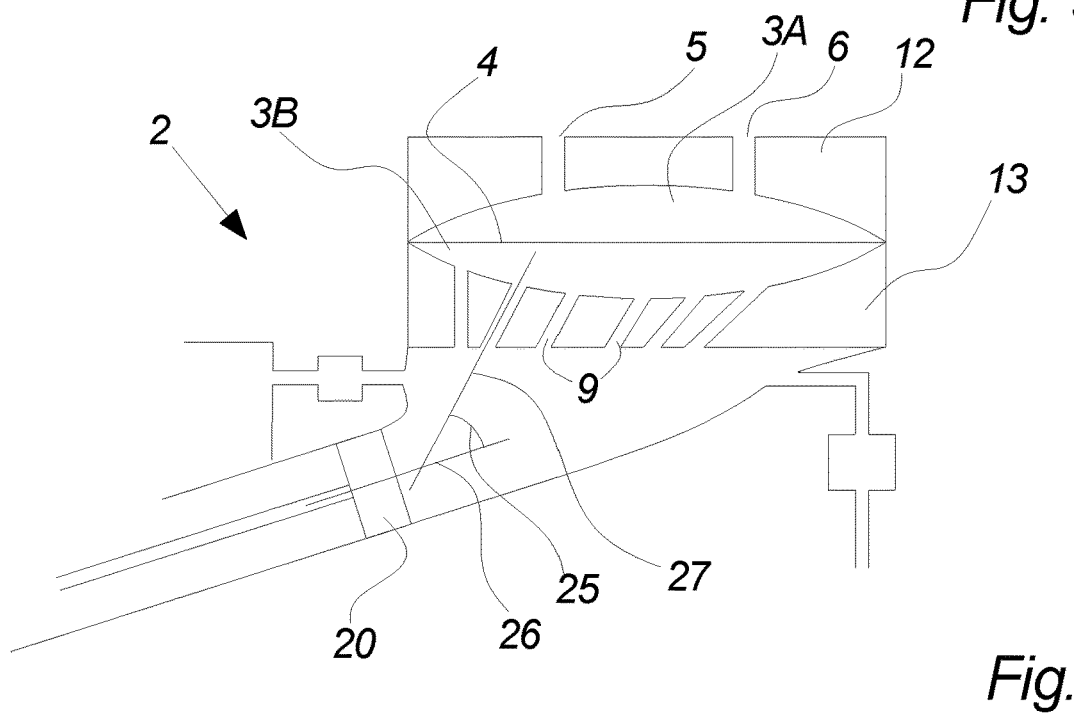

FIG. 5*b* illustrates another embodiment of the compressor according to the invention having ports 9 tilted with an angle 25 different from 90 degrees in relation to the movement of the piston 26. As can be seen here, the tilt angle 25 is between the movement of the piston 26 and one of or all of the ports 9 are between 5 and 30 degrees, preferably between 10 and 20 degrees. An implementation of the tilted ports 9 in such non-ideal way is less expensive to implement and is still very beneficial in that it reduces the prior art angle from 90 degrees to 30 degrees and thereby reducing the "corner" around which the fluid has to pass on its way from piston towards inlet opening 5.

According to a preferred embodiment, the compressor is oriented so that the piston 20 is moving in the horizontal plan 26. This means that in a preferred embodiment the compressor head 2 and thereby ports 9 hereof is tilted with an angle 25 relative to the horizontal plan. Preferably the angle 25 is between 5 and 40 degrees and an angle of 15 degrees has turned out to be suitable. Hence in a preferred embodiment of the invention the compressor 1 is constructed so that the direction movement of the piston 26 has an angle 25 of 15 degrees to at least one of the ports 9.

It should be mentioned that the ports 9 may vary in whatever tilt angle optimizes the hydraulic flow the most and this may also changes the length of the ports through the lower head 13. By calculation and depending on desired movement of the diaphragm 4 it is possible to design the ports 9 in a way so that the hydraulic fluid moves the diaphragm 4 in a wave like movement from the side of chamber 3 having the inlet valve 5 towards the side of the chamber 3 having the outlet valve 6. This is advantageous in that by such wave like movement of the diaphragm 4 the gaseous fluid is forced to follow the predefined flow path 11 between inlet and outlet valve 5, 6. Which facilitates increased speed in that there is no or limited resistance in the predefined flow path 11 and less tendency to turbulence flow as is the case with circular chambers. Further it facilitates asymmetric cooling in that the gaseous fluid will have the highest temperature around the outlet valve 6.

As can be understood from the above the dynamics of both the hydraulic fluid and the gaseous fluid in a compressor according to the present invention is improved. In the following an elaboration of the improved dynamics is found. To understand the improved dynamics of the compressor head 2 of the present invention one could start by taking a look at the dynamics of a circular shaped diaphragm compressor head.

In relation to gas dynamics, it is known in the art that it is of critical importance to uncover the inlet check valve opening as early as possible during the suction stroke and provide ample clear area for gas to flow into the compressor head. The method employed to achieve this in the traditional circular shaped diaphragm compressor head is to locate the inlet gas ports close to the center of the head. This provides the most depth in the compression chamber and therefore flow area to introduce gas to the compression chamber. In combination with this the hydraulic fluid should be directed in a way so as to pull the diaphragm downward at the center of the chamber first.

Further in relation to gas dynamics of the circular shaped diaphragm compressor head, it is known in the art that it is of critical importance to evacuate all gas from the compression chamber on the discharge or compression stroke in order to achieve highest volumetric efficiency. Therefore the discharge gas ports are placed directly at the center of the compression chamber in order to allow the shortest path possible for all gas in the chamber to exit.

Further it is of critical importance not to allow the diaphragm to cover the discharge gas ports before all gas is evacuated from the compression chamber to achieve maximum volumetric efficiency.

These circumstances occurring within the compression chamber result in increased flow resistance due to diversion of the working fluid flow away from its most linear pathway. This increased flow resistance and delicate dynamic of diaphragm movement place an undesirable limit on the operating speed of the compressor.

Therefore the inventive compressor head 2 described in this document is designed such that the inlet and discharge gas ports 5, 6 are positioned away from each other by a distance R so as to allow independent manipulation of the diaphragm 4 movement relative to the inlet and discharge gas ports 5, 6 and the position in the stroke of the compressor.

Once the inlet and discharge gas ports 5, 6 are separated by a significant distance R as described above, the hydraulic fluid dynamics can be manipulated specifically to drive the diaphragm 4 away from the inlet gas ports 5 immediately at the start of the suction stroke and also drive the diaphragm 4 towards the inlet gas ports 5 immediately at the start of the discharge or compression stroke.

In addition the design of the inventive compressor head 2 the hydraulic fluid can be manipulated so that the discharge gas ports 5 are not covered until the very end of the compression stroke. By doing so the compression chamber 3a can be filled to a maximum with gas on the inlet stroke and nearly all of the gas can be displaced from the compression chamber 3a by the end of the compression stroke.

The above mentioned separation of inlet and discharge gas ports is accomplished by the elongated compression chamber 3 design in such a way that the deepest portion of the compression chamber 3a stretches over a length R, rather than occurring at a single point.

The inlet gas port 5 is positioned at one end of the straight section in the plane F of the elongated chamber 3 and the discharge gas port 6 is placed at the opposing end of the straight section of the elongated cavity 3 also in the plan F. The elongated chamber 3 design is combined with the mechanical piston driving the hydraulic fluid attached to the lower chamber 3b at the inlet gas port 5 end.

Furthermore when the compressor head 2 and thereby also the ports 9 is positioning at an appropriate angle relative to the movement of the piston and thereby to the hydraulic fluid pathway 26 i.e. the tilt angle 25, the hydraulic fluid has an almost linear pathway 26 to the inlet gas port 5, and a diverted pathway 28 to the discharge gas port 6. Since the hydraulic fluid then at all times during the compression cycle has a nearly linear pathway 26 to the inlet gas port 5, most of the hydraulic fluid flows through this section of the lower head 13 and thus flow resistance is dramatically reduced facilitating higher speed operation of the diaphragm compressor 1.

Further it should be mentioned that this is also the main reason for the wavelike movement of the diaphragm 4 in the elongated chamber 3.

The diaphragm 4 may be built from a plurality of individual sheets (not illustrated). In a preferred embodiment of the invention, the diaphragm 4 is built from three individual stacked sheets. Illustratively described then, on top of the lower head 13 (also referred to as oil plate) a lower, a middle and an upper sheet is placed. On top of the upper sheet the upper head 12 (also referred to as gas plate or process plate) is placed and then fastened preferably by bolts to the lower head 13.

The diaphragm sheets may be made of metal or alloys. In a preferred embodiment of the invention the sheets are made of Inconel alloy 718 (raw material) which is a high temperature nickel alloy having high tensional and fatigue strength and is resistant to hydrogen.

It is preferred that the raw material of two successive sheets are not in direct contact i.e. understood as none coated surfaces of the sheet are not in physical contact in the absence of lubrication.

Therefore it is preferred that at least one of the sides of the sheets are coated. Hence, The upper side of the upper sheet is preferably coated preferably with a diamond like coating (also referred to as DLC vapor deposition). At least one of the sides of the middle and lower sheets are according to an embodiment preferably coated with Chromium Nitride.

The lower side of the lower sheet is not necessary to coat in that the hydraulic fluid such as an oil has lubrication in it. Further, if the middle sheet is coated with a silver coating (on both the upper and lower sides), the lower sheet need not to be coated at all.

Accordingly, there are various combinations of sides of sheets to be coated with different coatings to avoid the raw material of the sheets are in physical contact with each other. It should be mentioned that other than the mentioned raw material and coatings may be suitable.

Figure 6:
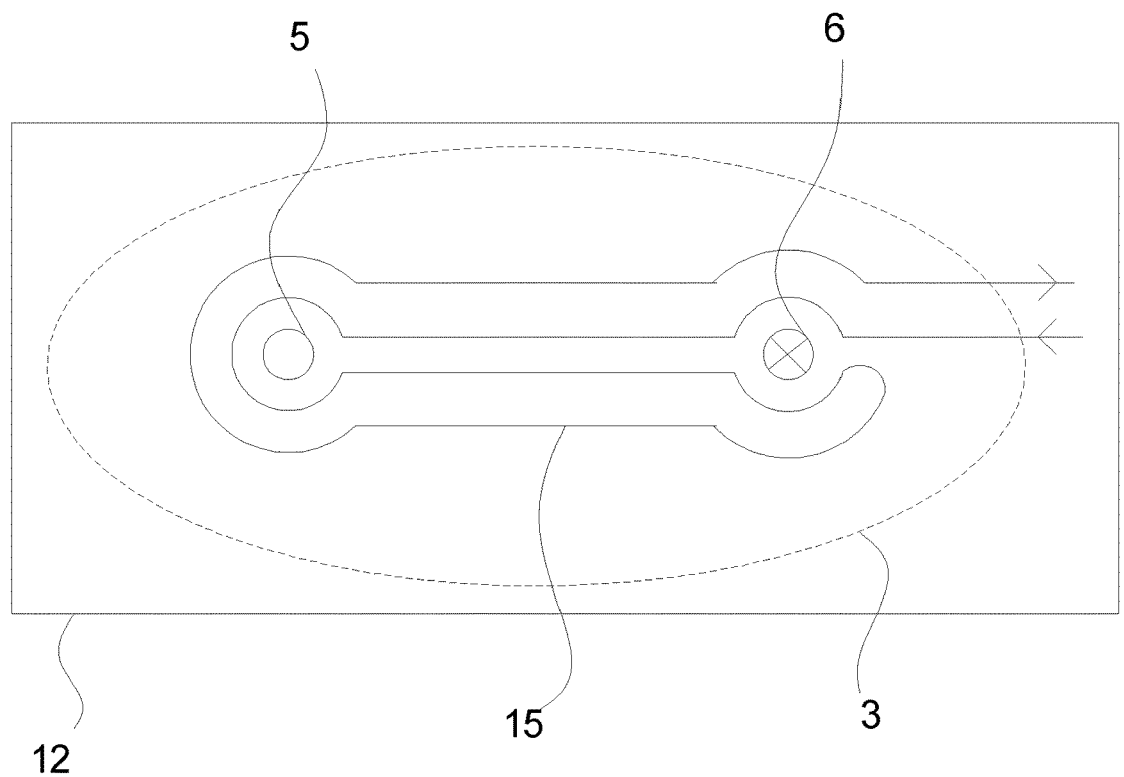
FIG. 6 illustrates a top view of cooling channels of the upper head.

Now turning to FIG. 6 which is illustrating an example of placing cooling channels 15 in the upper head 12. Due to the above described controlled flow path 11 from inlet 5 to outlet valve 6 the cooling channels can be placed so as to enter the upper head 12 with lowest temperature coolant as close to the outlet valve 6 as possible. This is advantageous in that it is at the area of the outlet valve 6 the temperature of the gas is highest.

FIG. 6 only illustrates one way of locating the cooling channels but obviously the cooling channels may be positioned in various different patterns. Preferably all so as to have an asymmetric cooling of the upper head 12 with increased cooling at the area around the outlet valve 6. This is very advantages in that the increased efficiency of the inventive compressor head 2 leads to an increased requirement in relation to remove as much heat as possible during the compression process i.e. operation of the compressor 1.

It is known that high surface area to volume ratio, high velocity of the gas in the compression chamber 3a to interrupt the boundary layer and cooling channels 15 in as close proximity to the heat source as possible is beneficial to facilitate maximum heat transfer.

With this in mind together with the gas dynamics of the circular compressor head design, it is apparent that in the circular compressor head design the gas is swirling in the compression chamber with varying velocity due to the positioning of both inlet and discharge gas ports at the center of the head. This swirling of gas, does not create a definitive pathway where the hot gas can be cooled, and also does not provide high gas velocity which would reduce the boundary (boundary layer) to heat transfer between the gas and the head.

Also at this point the inventive elongated compression chamber 3a is advantage in that the separation of the inlet and discharge gas ports 5, 6 directs the gas from one end of the elongated compression chamber 3a to the other with a predefined definite flow path 11 at considerable velocity. The separation of the inlet and discharge gas ports 5, 6 now allows cooling channels 15 to be positioned in between the ports 4, 5 and surround the discharge port 6 more thoroughly. This is beneficial in that by this design it is possible to focus on cool the compressed and therefore hot gas as it approaches the discharge gas port 6 thereby obtaining an asymmetric cooling and maintaining a high surface area to volume ratio.

Figure 7:
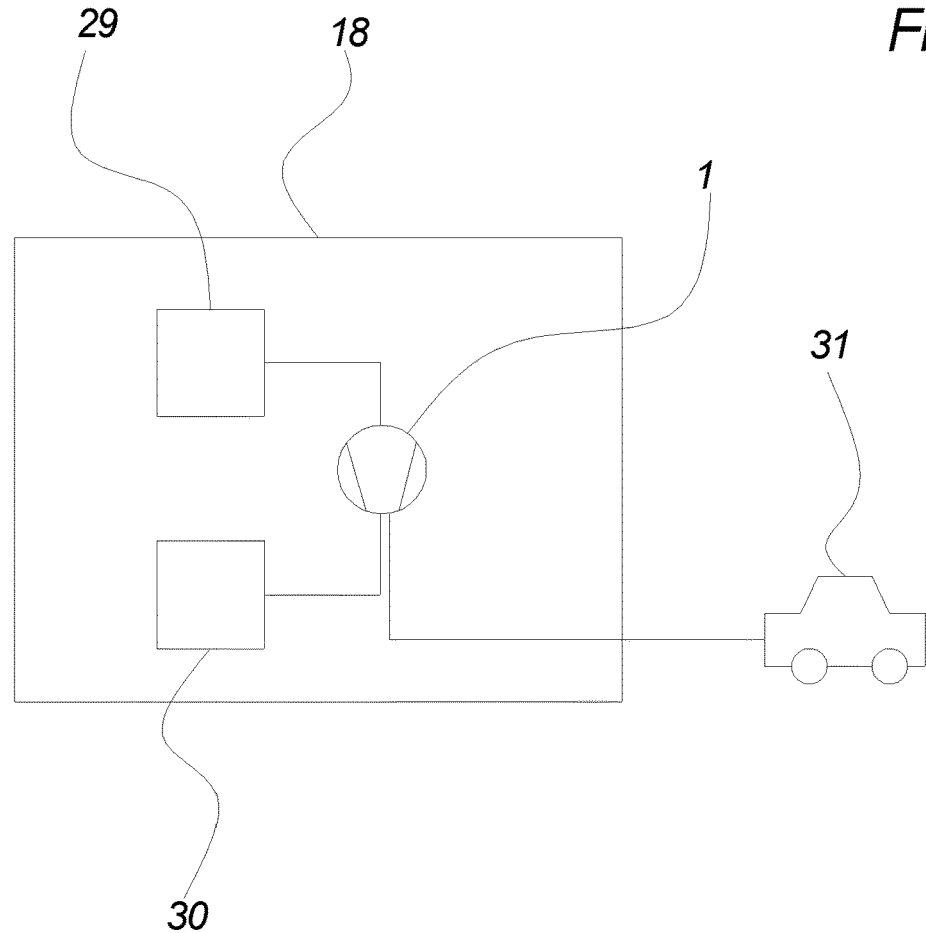
FIG. 7 illustrates a hydrogen fueling station with a compressor as described though out this document.

Now turning to FIG. 7 which illustrates a hydrogen fueling station 18 comprising a diaphragm compressor 1 as described in this document i.e. preferably including one or more of the features mentioned in the claims. Further the fueling station 18 comprising a first and second hydrogen storage 29, 30. The diaphragm compressor 1 may serve several purposes in the hydrogen fueling station such as making sure that pressure level is above a certain threshold of e.g. between 50 and 100 MPa in the second hydrogen storage 30, facilitate refueling of a vehicle 11 with hydrogen at a pressure between e.g. 50 and 85 MPa, assist in moving hydrogen from a transportable storage to the first or second storage 29, 30, etc.

As an example could be mentioned that the energy consumption of the compressor 1 used in a hydrogen fueling station is between 10 kW and 80 kW and the weight of such compressor is above 800 kg.

The hydrogen fueling station 18 may of course also include not illustrated control units, pressure or temperature sensors, valves, additional hydrogen storages etc. in order to make it possible for a vehicle to refuel at such station 18.

It should be mentioned that the diaphragm 4 could both be clamped to the compressor head 2 or sliding between the upper and lower head 12, 13 when moving up and down in the chamber 3.

Further, von-Mises Stress in the diaphragm 4 is carefully controlled and preferably limited to a threshold value of e.g. 200 MPa. This is achieved through shaping of the compression chamber 3 in such a way as to distribute the stress nearly equally throughout the chamber 3. Consideration is given to the areas which are subject to additional stress from other factors such as friction or bending and the total stress considering all factors is then equalized to maximize the lifetime of the diaphragm 4. Ultimately this means that the compression chamber 3 is carefully machined with tight tolerance and precision machining processes.

Hence from this document it is now clear that the present invention at least has the advantages of an increased volume of the compression chamber 3 without a disproportionate increase in required clamping force, a better gas flow with a definite flow path 11 between input 5 and output 6 improves heat transfer and better cooling channels positioned in between the ports 5, 6 and surround the discharge port 6 leading to added efficiency and lifetime on components and facilitate higher speed. It should be mentioned that even though in this description only a hydraulic system 10 for driving the piston 20 and thereby the diaphragm 4 is mentioned the present invention would also work in case the hydraulic system 10 is replaced by a non-hydraulic system. A non-hydraulic system could be any available motive force including a mechanical or magnetic system.

Finally it should be mentioned that even though the diaphragm compressor 1 in this document is described in relation the high pressure such as pressures above 10 MPa and high speed such as above 500 cycles per minute then it works perfectly well at pressures and speeds below these limits.

The invention claimed is:

1. A high pressure diaphragm compressor for pressurizing a gaseous fluid to a pressure in the range from 10 MPa to 200 MPa, the compressor comprising a compressor head having an oblong shaped chamber wherein ends of the chamber as viewed from above, have a super elliptic shape with concave corners and when viewed from a side, the chamber comprises adjoining convex and concave circular portions that converge and extend to the ends of the chamber.

2. The compressor according to claim 1, wherein the chamber is defined by an upper head and a lower head of the compressor head,
    wherein the chamber comprises an upper chamber and a lower chamber separated by a diaphragm,
    wherein the upper head comprises an inlet valve facilitating a fluid connection between the upper chamber and a first gaseous system,
    wherein the upper head comprises an outlet valve facilitating a fluid connection between the upper chamber and a second gaseous system,
    wherein the lower head comprising a plurality of ports facilitating a fluid connection between the lower chamber and a hydraulic system,
    wherein the hydraulic system comprises a piston facilitating moving the diaphragm in the chamber by circulation of a hydraulic fluid, and
    wherein the compressor further comprises leakage detection detecting leakage of gaseous fluid or hydraulic fluid from the chamber.

3. The compressor according to claim 2, wherein a ratio of depth to width of the upper chamber is between 1:10 and 1:100.

4. The compressor according to claim 1, wherein a ratio of width to length of the chamber is between 1:1.2 and 1:2.5.

5. The compressor according to claim 2, wherein the inlet valve and the outlet valve are both located in a plane in the upper head.

6. The compressor according to claim 2, wherein a distance between a center of an opening comprising the inlet valve and a center of an opening comprising the outlet valve is at least 35% of the length of the chamber.

7. The compressor according to claim 2, wherein a tilt angle between a direction of the movement of the piston and a direction of at least one of the plurality of ports is less than 90 degrees.

8. The compressor according to claim 7, wherein a flow path of the hydraulic fluid from a compression chamber of the hydraulic system towards the inlet valve is substantially linear.

9. The compressor according to claim 8, wherein the upper head includes cooling channels guiding a coolant from an area around the outlet valve along a predefined flow path towards the inlet valve.

10. The compressor according to claim 9, wherein at least one cooling channel is linear between the inlet valve and the outlet valve.

11. The compressor according to claim 2, wherein an inner surface of the upper head, an inner surface of the lower head or the diaphragm comprises a coating by physical vapor deposition.

12. The compressor according to claim 11, wherein the coating is an amorphous carbon coating.

13. The compressor according to claim 12, wherein the amorphous carbon coating is a diamond-like carbon.

14. The compressor according to claim 2, wherein the diaphragm is made of a plurality of individual stacked sheets.

15. The compressor according to claim 14, wherein the plurality of stacked sheets are made of Inconel alloy.

16. The compressor according to claim 14, wherein at least one side of an upper sheet and one side of a middle sheet of the plurality of stacked sheets comprise a coating.

17. The compressor according to claim 16, wherein the coating is made by physical vapor deposition or dipping and comprises at least one of: diamond like coating, Chromium Nitride coating, and silver coating.

18. The compressor according to claim 2, wherein the diaphragm is a sliding diaphragm.

19. The compressor according to claim 2, wherein pressure in the upper chamber is in the range from 70 MPa to 200 MPa and wherein the upper head and the lower head are connected by a plurality of bolts.

20. The compressor according to claim 1, wherein the gaseous fluid is a low density gas.

21. The compressor according to claim 1, wherein the compressor is configured to be disposed in a hydrogen fueling station.

22. A hydrogen fueling station, comprising a first hydrogen storage and a second hydrogen storage and a compressor having an oblong shaped chamber, wherein ends of the chamber as viewed from above, have a super elliptic shape with concave corners and when viewed from a side, the chamber comprises adjoining convex and concave circular portions that converge and extend to the ends of the chamber, wherein the compressor is arranged for moving hydrogen at a first pressure in the first hydrogen storage to a second pressure in the second hydrogen storage.

* * * * *